United States Patent [19]

Horowitz

[11] 4,361,982

[45] Dec. 7, 1982

[54] UMBRELLA TOPIARY FRAMEWORK

[76] Inventor: Alvin E. Horowitz, 2320 SW. 23rd Ave., Miami, Fla. 33145

[21] Appl. No.: 229,895

[22] Filed: Jan. 30, 1981

[51] Int. Cl.³ ............................................. A01G 17/06
[52] U.S. Cl. ............................................. 47/45; 47/4; 47/47; 135/5 R; 135/7.1 R; 248/219.2; 248/222.1
[58] Field of Search ...................... 47/4, 44, 45, 46, 47, 47/31, 33, 41.12; 135/5 R, 7.1 R; 248/222.1, 219.2; 40/607

[56] References Cited

U.S. PATENT DOCUMENTS

| | | | |
|---|---|---|---|
| 284,745 | 9/1883 | Le Moult | 47/41.12 |
| 1,114,933 | 10/1914 | Stricklen | 47/31 X |
| 2,181,016 | 11/1939 | Gross | 47/45 X |
| 2,764,993 | 10/1956 | Wallace et al. | 135/5 R |
| 3,188,771 | 6/1965 | Ballai | 47/47 |
| 3,630,811 | 12/1971 | Radius | 47/41.12 X |
| 3,992,812 | 11/1976 | Horowitz | 47/33 X |
| 4,106,233 | 8/1978 | Horowitz | 47/47 X |

FOREIGN PATENT DOCUMENTS

| | | | |
|---|---|---|---|
| 467505 | 10/1928 | Fed. Rep. of Germany | 47/44 |
| 276547 | 9/1927 | United Kingdom | 40/607 |
| 1404974 | 9/1975 | United Kingdom | 47/45 |

*Primary Examiner*—Steven A. Bratlie
*Attorney, Agent, or Firm*—Ernest H. Schmidt

[57] ABSTRACT

An umbrella-shaped topiary framework has a supporting post simulating natural wood bark along its outer surface, at the upper end of which is supported an umbrella-like framework upon the top of which is received a circular umbrella pad fabricated of face-to-face sheets of plastic, open-mesh sun screening material sandwiching thereinbetween a layer of sphagnum moss. The supporting post as well as the umbrella-like framework are comprised of interfitting parts of a molded synthetic plastic material for compact storage and transportation, and durability in use. When vertically supported in soil at the base of the supporting post, vines or climbing plants rooted in the soil grow up along the outside of the post and under and over the umbrella pad at the top of the post to form an unusually attractive umbrella topiary.

3 Claims, 6 Drawing Figures

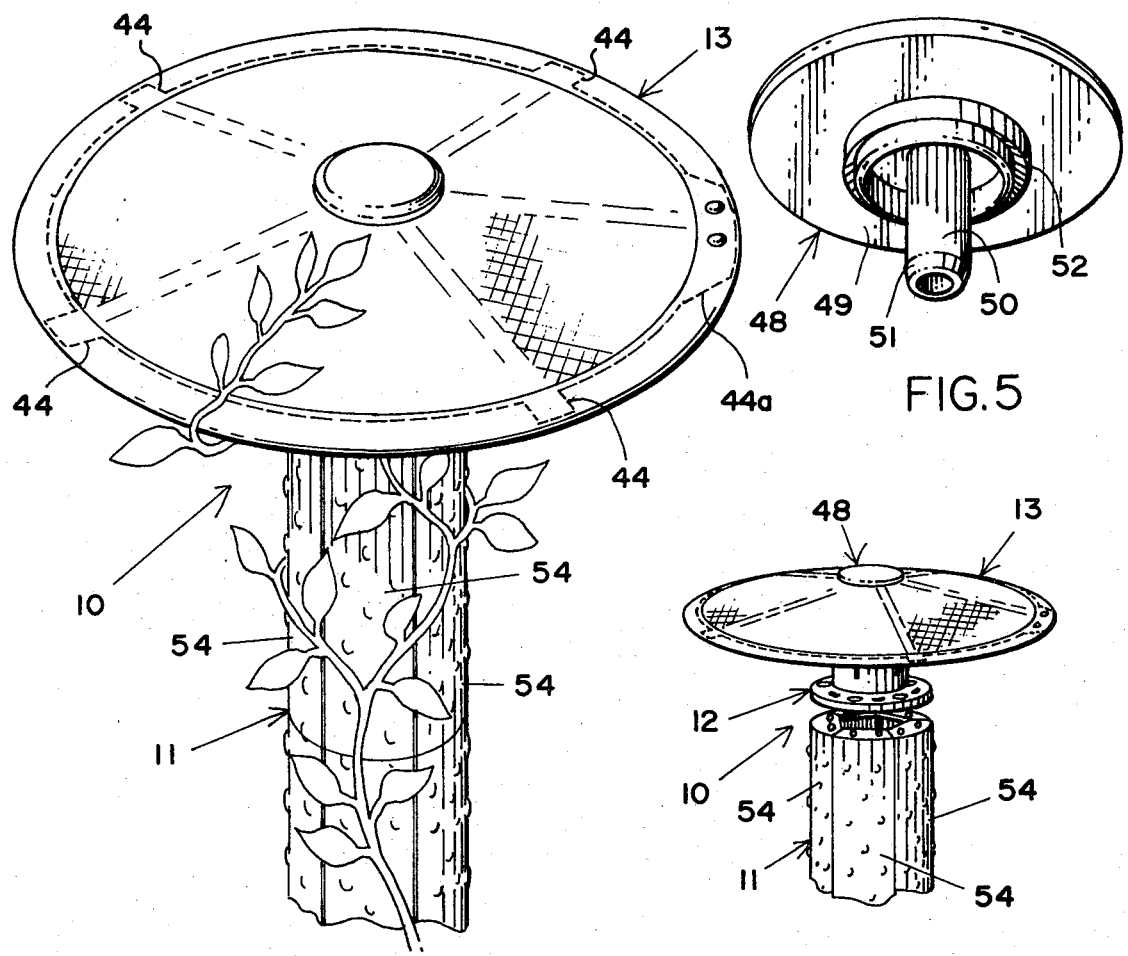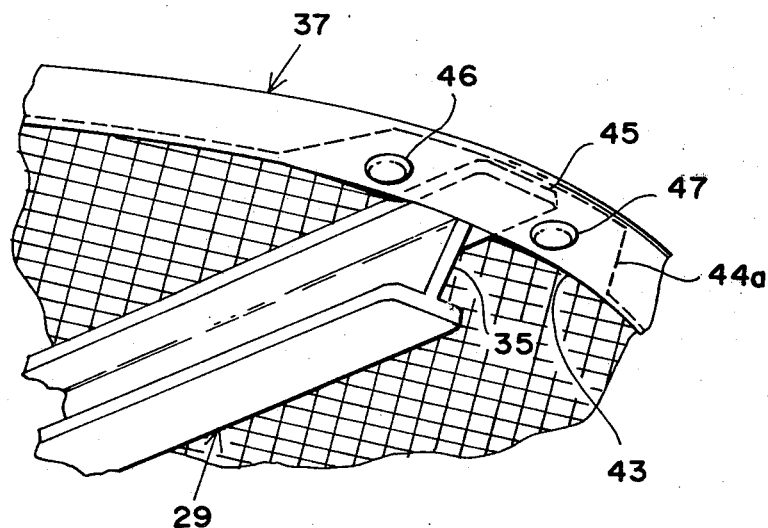

UMBRELLA TOPIARY FRAMEWORK

This invention is directed to ornamental plants and is directed particularly to a topiary framework outer surface portions of which are particularly well suited to the attachment and growth therealong of vines or climbing plants so as to produce a luxuriously covered topiary simulating an umbrella in appearance.

The principal object of the invention is to provide a novel and improved topiary framework of the above nature which can be inexpensively manufactured in kit form of a plurality of synthetic plastic molded parts that can easily be assembled for use, and the supporting post portions of which have a rough surface simulating natural tree bark as well as through openings, together providing means by which the tendrils of the climbing vines can anchor themselves as the plant grows towards the umbrella head portion at the top, and wherein the umbrella head at the top comprises an umbrella pad fabricated of face-to-face layers of plastic, open-mesh sun screening filled thereinbetween with sphagnum moss providing anchoring means, moisture and nutritional supplement to the plant.

Another object is to provide a topiary framework of the above nature wherein the supporting post comprises a hollow assembly permitting filling with sphagnum moss or the like for supplying additional moisture and nutritional supplement to the plant to insure close, luxurious growth underneath and over the top of the simulated umbrella framework.

Another object of the invention is to provide an umbrella topiary framework of the character described which can conveniently and inexpensively be fabricated of synthetic plastic materials by the use of injection molding techniques.

Other objects, features and advantages of the invention will be apparent from the following description when read with reference to the accompanying drawings. In the drawings, wherein like reference numerals denote corresponding parts throughout the several views:

FIG. 1 is an oblique view of an assembled topiary framework embodying the invention, as seen from above;

FIG. 2 is an oblique view similar to that of FIG. 1 but showing the framework in partially disassembled "exploded" condition to illustrate how the parts are assembled;

FIG. 5 is an oblique view as seen from underneath of the circular locking cap at the top of the topiary, and;

FIG. 6 is a partial, oblique view, as seen from underneath, of an outer end portion of one of the umbrella arm members, illustrating how it connects with the circular umbrella pad.

Figure 4:
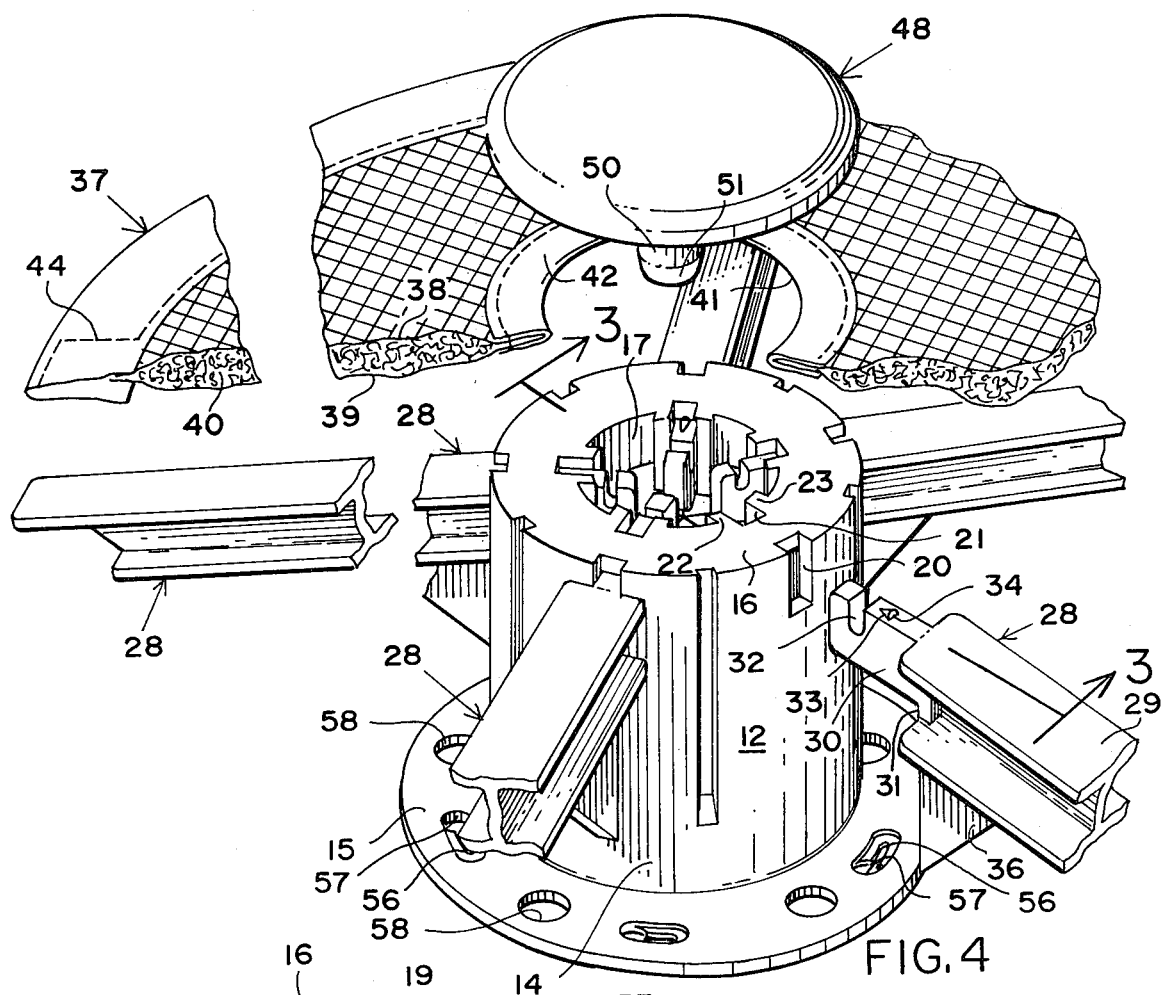
FIG. 4 is an oblique, "exploded," fragmentary view of upper end portions of the umbrella topiary framework illustrating, together with FIG. 3, how the various framework parts inter-fit upon manual assembly and without the use of tools.

Referring now in detail to drawings, reference numeral 10 in FIGS. 1 and 2 designates, generally, an umbrella topiary framework embodying the invention, the same comprising a bark-covered, simulated tree trunk support post 11, at the upper end of which is removably interconnected a union 12 supporting an umbrella head assembly 13.

The bark-covered tree trunk support post 11 will preferably be assembled of one or more sets of five imitation bark board members similar to those illustrated and described in my U.S. Pat. No. 4,106,233, issued Aug. 15, 1978, arranged in a circle, with differences principally in the vertical interconnecting mechanism as hereinafter more particularly described.

The union 12, which is preferably integrally molded of a tough synthetic plastic material such as a polystyrene, comprises an upstanding tubular post portion 14 the lower end of which merges with an outwardly-extending, circular flange portion 15.

Figure 3:
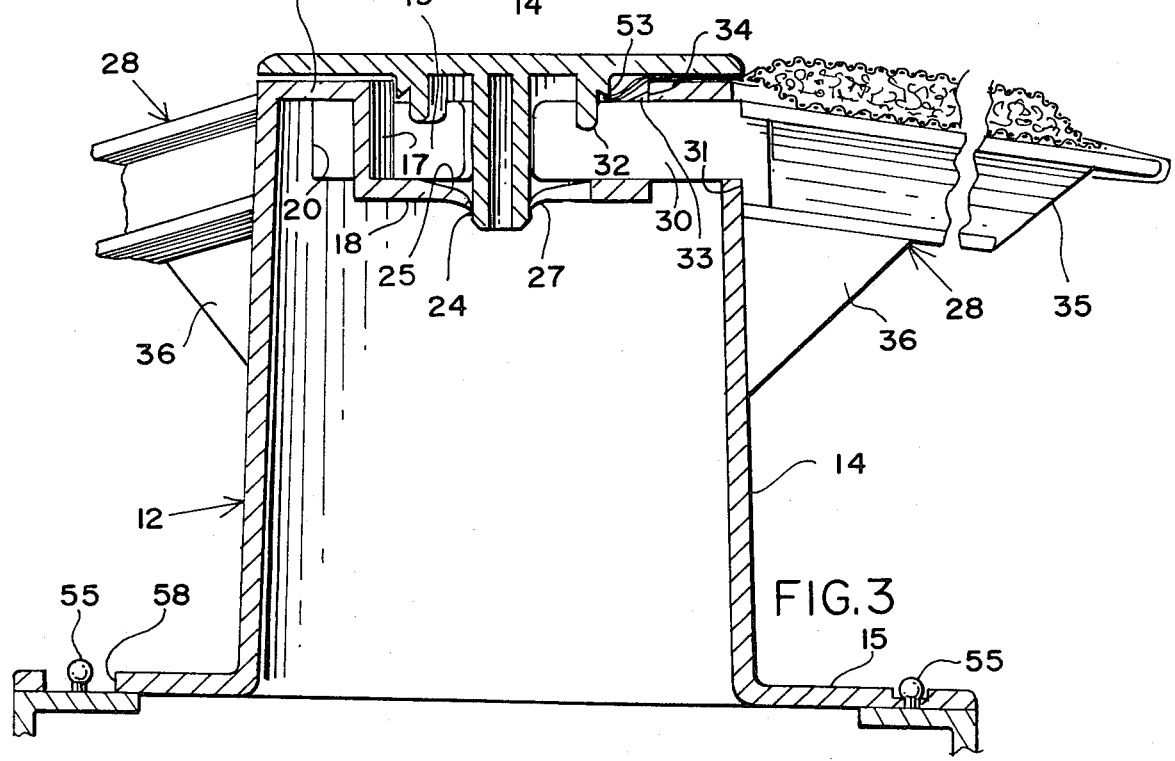
FIG. 3 is a partial, vertical cross-sectional view of the assembled umbrella topiary framework shown in FIG. 1, on an enlarged scale, taken along the plane indicated at 3—3 of FIG. 4.

As best illustrated in FIGS. 3 and 4 the upper end of the tubular post portion 14 has integrally formed therewith an annular, inwardly-directed top flange portion 16, the inner periphery of which merges with a reduced-diameter, coaxial portion 17 terminating in the bottom wall portion 18, together defining a generally cylindrical depression or recess 19. As best illustrated in FIG. 4, the post portion 14 of the union 12 is comprised, at its upper end, with a plurality, five in the embodiment illustrated, of equidistantly-peripherally-spaced, vertical slots 20. Radially aligned with each slot 20 is a rectangular recess 21, the opposed sides of each of which are buttressed by integrally molded, vertical bosses 22, 23. The bottom wall portion 18 of recess 19 has a central opening 24 surrounded by an annular wall portion 25 tapered to a substantially reduced thickness at the inner end. The bottom wall portion 18 is also provided with a plurality of equidistantly-peripherally-spaced cuts defining a like plurality, five in the embodiment illustrated, of flexible catch members 27.

The umbrella head assembly 13 comprises, in association with the above described union 12, a plurality of umbrella arm members 28, one for each of the union slots 20, which will also preferably be integrally molded of a tough synthetic plastic material such as a polystyrene. As best illustrated in FIGS. 3, 4 and 6, each arm member comprises an elongated I-bar channel portion 29, the inner end of which is formed with a slightly angularly off-set, longitudinally-outwardly-projecting hook portion 30 extending centrally outwardly of the web of I-bar channel portion 29, but of somewhat increased thickness for added strength. As best illustrated in FIG. 3, the hook portion 30 extends vertically somewhat short of the underside of the I-bar channel portion 29, to define a vertical shoulder 31 thereat. The upper edge of the hook portion 30, near its outer end, is formed with a short, vertically-extending recess 32, which will preferably be rounded at its bottom. The upper edge of the hook portion 30 is also integrally formed with an upwardly-projecting, triangular boss 33, defining a vertical shoulder 34 for the purpose hereinafter appearing.

The outer end of each umbrella arm member 28 has its central web and bottom plate portion cut away at an angle, as indicated at 35 in FIGS. 3 and 6, with the upper plate portion left projecting outwardly by a comparatively short distance for interhooking connection with an umbrella head assembly pad, as is hereinafter more particularly described with reference to FIG. 6.

As is best illustrated in FIGS. 3 and 4, the umbrella arm members 28 are assembled to the union 12 simply by inserting the hook portions 30 thereof through the vertical slots 20 so that the vertical shoulders 31 seat against the outer periphery of the union and the vertical shoulders 34 of the triangular bosses 33 hook behind the inner vertical surfaces of their respective rectangular recesses 21 in said union. To provide for greater rigidity of the umbrella arm members 28 at their interconnection with union 12, especially with respect to the imposition of downwardly-directed loads, each of said arm members is integrally formed with a triangular web portion 36 at its inner end the inner edge of which lies in the same plane as its pertaining vertical shoulder 31 so as to seat against extended length portions at the outer periphery of said union.

The umbrella head assembly 13 further comprises a circular umbrella pad 37 for supporting plant growth upon the top of the topiary framework, said pad preferably being fabricated of a pair of face-to-face layers of plastic screening 38, 39 sandwiching thereinbetween a layer of sphagnum moss 40. The flexible umbrella pad 37 is formed with a central opening 41, which will preferably be trimmed with sewn-in-place binding 42. The outer periphery of the umbrella pad 37 is similarly trimmed with a fabric binding 43 to hold the assemblage together. As best illustrated in FIGS. 1 and 6, the underside of the outer peripheral binding 43 is sewn with 5 equidistantly-spaced pockets 44 and 44a for the interhooking reception of the outwardly-projecting end portions 45 of the umbrella arm members 28 upon fitting in place of the umbrella pad 37. The four pockets 44 are narrow enough to just permit fitting therein of four of the arm member end portions 45, whereas pocket 44a is comparatively wide to allow folding over the last arm member end portion without undue stretching. A pair of snap buttons 46, 47 applied to the umbrella pad pocket 44a close to each side of the associated arm member end portion facilitates securement of the umbrella pad at the top of the topiary framework. It will be understood that the circular umbrella pad 37 is of such size as to just cover the umbrella arm members 28 and permit placement of the outer end portions of said umbrella arm members in their respective pockets 44 upon assembly to the framework as described above.

As illustrated in FIG. 3, the size of the central opening 41 of the umbrella pad is such that it extends just short of the vertically-extending recesses 32 of the assembled umbrella arm members 28. As best illustrated in FIGS. 3, 4 and 5, a circular locking cap 48 serves to finish the umbrella head assembly 13 while at the same time securing the assembled parts together. As shown in FIG. 5, the locking cap 48 is integrally formed with a flat, circular top plate portion 49 extending coaxially from the underside of which is a tubular locking pin 50 the outer peripheral end of which is chamferred as indicated in 51. Also integrally molded with the underside of top plate portion 49 is a comparatively short, circular skirt portion 52, the outer end of which is rounded and which is of such size as to fit within the recesses 32 of umbrella arm members 28 upon assembly (see FIG. 3). The outer periphery of the circular skirt portion 52, at the base thereof is formed with a comparatively short, outwardly-extending, angular clamp portion 53, which serves to clamp marginal peripheral edge portions of the central umbrella pad opening 41 against outer end portions of the umbrella arm member hook portions 30. This insures that there will be no sliding movement of the central portion of the umbrella pad at the top of the supporting framework.

As further illustrated in FIG. 3, the tubular locking pin 50 of the circular locking cap 48, when said locking cap is pushed into place, extends through central opening 24, flexing catch members 27 inwardly so that they press into peripheral wall portions of said tubular locking pin to frictionally retain the locking cap in place. When so fitted in place, the circular skirt portion 52 fits into the vertically extending recesses 32 of the umbrella arm members 28, additionally securing them in place. The umbrella arm member hook portions 30, moreover, are of such length that they abut the tubular locking pin 50 of the locking cap 48 (see FIG. 3). In addition, the underside of the locking cap top plate portion 49 clamps inner marginal portions of the umbrella pad against upper surface portions of the union top flange portion 16, further securing it in place.

FIGS. 2, 3 and 4 illustrate how the union 12, together with umbrella head assembly 13 described above, is removably attached to the upper end of the simulated bark covered tree trunk support post 11. As illustrated in FIGS. 2 and 3, the upper ends of the individual bark board members 54 comprising the tree trunk support post 11 each have a pair of longitudinally-outwardly-projecting, round-headed connector projections 55 which serve for interconnection with locking slots at the lower end of another set of laterally interconnected imitation bark board members for extending the length of a simulated tree trunk. In accordance with the present invention, peripherally alternate ones of these headed connected projections 55 are utilized to connect with the circular flange portion 15. To this end, the circular flange portion 15 is provided with a plurality, (five in the embodiment illustrated), of circularly spaced slot openings 56 having an enlarged, circular opening portion 57 at one end of such size as to admit, one each, of the head portions of the connector projections 55. The union flange portion 15 is also provided with comparatively large, circular openings 58 between the slot openings 56 to allow for free through passage of every other one of the ten connector projections 55 at the upper end of the tree trunk support post assembly 11. To assemble the union 12 to the top of the support post 11 it is only necessary to place it upon the upper end of the support post so that the connector projections 55 extend, alternately, through the slot openings 56 and circular openings 58, whereupon, after twisting said union a short distance in the clockwise direction relative to said tree trunk support post, the headed portions of the connector projections will pass above narrower portions of said slot to lock the parts together. It will be understood that the circular openings 58 are large enough to avoid interference with the five of the ten connector projections not being used in the securement of the union 12 to the bark covered tree trunk support post 11 as the parts are thus interjoined.

In use of the umbrella topiary framework hereinabove described, it is to be understood that as many sets of imitation bark board members as may be necessary to produce the desired height in the overall structure could be utilized. Also, the lower end of the support post 11, whether comprised of one or more sets of the imitation bark board members may be supported by burying in the soil of a large pot or container in which the plant or plants to be grown on the topiary framework are to be rooted. In use, as illustrated in FIG. 1, the vines or climbing plants P will grow up and around the upper end of the trunk support post 11, and twine around the union 12 and under and over the umbrella head assembly 13 to produce an unusually striking umbrella-like topiary. The openings and bark-like projections on the support post 11 provide anchoring means for the plant tendrils, as do the openings in the screening comprising the umbrella pad 37. The sphagnum moss within the umbrella pad 37, when supplied with a liquid fertilizer, provides moisture and nutritional supplement for rich and hardy growth of the topiary. To further foster luxurious plant growth, the tree trunk support post 11 can be filled with sphagnum moss wetted with liquid fertilizer. Water supplied to the sphagnum moss from time to time is retained for plant use over long time periods.

While I have illustrated and described herein only one form in which my invention can conveniently be embodied and practiced, it is to be understood that this embodiment is presented by way of example only and not in a limiting sense. The invention, in brief, comprises all the embodiments and modifications coming within the scope and spirit of the following claims.

What I claim as new and desire to secure by Letters Patent is:

1. An umbrella topiary framework comprising, in combination, a support post, an umbrella head assembly, means for interconnecting one end of said support post with said umbrella head assembly, said umbrella head assembly comprising a plurality of umbrella arm members extending radially outwardly of said interconnecting means, a circular umbrella pad supported from underneath upon said umbrella arm members, means for securing outer peripheral edge portions of said umbrella pad with respect to the outer ends of said radially-outwardly-extending umbrella arm members, said umbrella pad being fabricated of porous material for reception therewithin of the tendrils or the like of vine-like plants climbing over surface portions thereof, said umbrella pad comprising a pair of face-to-face layers of foranamous material sandwiching thereinbetween a layer of sphagnum moss, said support post being fabricated of a synthetic plastic material the outer surface of which simulates tree bark providing protuberances and crevices for the support of the tendrils or the like of climbing vines, said interconnecting means comprising a cylindrical union, a radially-extending flange at one end of said union, and a plurality of radially-extending, peripherally-spaced slots at the other end thereof, means for removably securing said one end of said support post with respect to said radially-extending flange, the inner ends of said umbrella arm members being removably receivable in one each of said radially-extending slots, means for releasably locking said umbrella arm members with respect to said cylindrical union, said means for releasably locking said umbrella arm members comprising a central opening at the other end of said union, a circular locking cap having a concentric tubular locking pin extending outwardly thereof and receivable in said central opening, and a plurality of flexible catch members extending partially inwardly of said central opening and operative to press into peripheral wall portions of said tubular locking pin to frictionally retain said locking cap in place, said locking cap further comprising a circular skirt portion surrounding said tubular locking pin and operative to fit into vertically-extending recesses provided at inner end portions of said umbrella arm members.

2. An umbrella topiary framework as defined in claim 1, wherein said circular umbrella pad has a central opening for the through passage of said locking cap pin, said umbrella pad opening being of lesser diameter than that of said circular locking cap, whereby said locking cap, when received in said central opening of said union, is operative to clamp an inner peripheral marginal portion of said umbrella pad against other end of said union.

3. An umbrella topiary framework as defined in claim 1, wherein said support post is hollow and provided with a plurality of through openings in its peripheral surface, thereby providing access of climbing plant tendrils to the interior of said support post for nourishment by a porous nutrient filling said support post.

* * * * *